United States Patent [19]
Mitchell

[11] 3,914,342
[45] Oct. 21, 1975

[54] ETHYLENE POLYMER BLEND AND POLYMERIZATION PROCESS FOR PREPARATION THEREOF

[75] Inventor: John H. Mitchell, Brazoria, Tex.

[73] Assignee: The Dow Chemical Company, Midland, Mich.

[22] Filed: June 10, 1974

[21] Appl. No.: 478,124

Related U.S. Application Data

[63] Continuation-in-part of Ser. No. 162,313, July 13, 1971, abandoned.

[52] U.S. Cl. .... 260/897 A; 260/88.2 R; 260/94.9 P
[51] Int. Cl. ............................................. C08f 37/18
[58] Field of Search ..................................... 260/897

[56] References Cited
UNITED STATES PATENTS

| 3,179,720 | 4/1965 | Hilmer | 260/897 |
| 3,280,220 | 10/1966 | Nelson | 260/897 |
| 3,380,978 | 4/1968 | Ryan et al. | 260/88.2 |

FOREIGN PATENTS OR APPLICATIONS

| 1,031,869 | 6/1966 | United Kingdom | |
| 714,619 | 7/1965 | Canada | 260/897 |
| 641,321 | 5/1962 | Canada | 260/897 |

Primary Examiner—Murray Tillman
Assistant Examiner—Carman J. Seccuro
Attorney, Agent, or Firm—M. S. Jenkins

[57] ABSTRACT

A high density ethylene polymer blend having improved impact strength and environmental stress crack resistance comprises a high molecular weight, non-elastomeric ethylene/propylene copolymer having a crystallinity of at least 5 percent and an intermediate molecular weight, high density ethylene polymer. The improved ethylene polymer blend is provided by a dual zone, low pressure, Ziegler solution polymerization process wherein (1) ethylene and propylene are copolymerized at a low pressure and solution temperatures in presence of a titanium-containing catalyst in an auxiliary polymerization zone, (2) ethylene is polymerized in a primary polymerization zone at low pressure and solution temperature in the presence of a titanium-containing catalyst and (3) the resulting solutions of the reaction products of both zones are combined to form an essentially homogeneous mixture.

8 Claims, No Drawings

ETHYLENE POLYMER BLEND AND POLYMERIZATION PROCESS FOR PREPARATION THEREOF

CROSS REFERENCE TO RELATED APPLICATIONS

This invention is a continuation-in-part of application Ser. No. 162,313 filed July 13, 1971, now abandoned.

BACKGROUND OF THE INVENTION

This invention relates to high density ethylene polymer blends, and more particularly to high density ethylene polymer blends having improved impact strength and environmental stress crack resistance and to a Ziegler polymerization process for the preparation thereof.

Ethylene polymers such as those described in Belgian Pat. No. 533,362 issued to Dr. Karl Ziegler are well known in the art today and are generally characterized by their great utility in the manufacture of relatively light weight articles having excellent flexibility over a wide range of temperatures and exhibiting chemical inertness toward aqueous and non-aqueous liquids. Unfortunately, such ethylene polymers are often found to be deficient in one or more of such properties as processability, impact resistance and environmental stress crack resistance.

In attempts to improve the processability of such ethylene polymers, it has often been a practice to blend dissimilar ethylene homopolymers and copolymers having higher branching (lower density) and usually lower molecular weights with the high density ethylene polymers as shown in U.S. Pat. No. 3,183,283. It is also known to improve stress crack resistance by incorporating various ethylene copolymers such as ethylene/vinyl acetate copolymers into the high density ethylene polymers as shown in U.S. Pat. No. 3,248,359. Unfortunately, it is found that such blends which reportedly have significantly improved stress crack resistance or processability also have considerably lower densities than the original high density ethylene polymer and therefore have lower rigidity (modulus or stiffness). In addition, methods customarily employed to accomplish blending including solution or slurry mixing of the independently formed polymeric components of the blend, are difficult to carry out. When solution blending techniques are employed in such cases, low solubility of the very high molecular weight component may preclude efficient blending. Because of the wide variation in melt viscosities (molecular weights) of the blend components, melt mixing may be impractical.

More recent attempts to provide more suitable blends of ethylene polymers by two-stage polymerization, i.e., polymerization of a portion of monomer in one zone under one set of conditions and polymerization of remaining monomer in another zone under a second set of conditions different from the first, have been reasonably successful in the production of more homogeneous products. Such techniques are described in U.S. Pat. No. 3,392,213, German Pat. No. 2,021,425, and Canadian Pat. Nos. 862,715 and 771,260. However, these prior art techniques generally do not provide polymers of high density with stress crack resistance, impact strength, and processability as is desired for many applications.

Therefore, it would be highly desirable to provide high density ethylene polymer blend having the combination of improved processability, physical properties (e.g., Izod impact strength) and stress crack resistance and to provide further improvement in the preparation of such improved high density, high molecular weight ethylene polymer blends.

SUMMARY OF THE INVENTION

In one aspect the present invention is a homogeneous, normally solid ethylene polymer blend comprising a major amount of a high density, intermediate molecular weight ethylene polymer and a minor amount of at least about 3 weight percent of a high molecular weight, nonelastomeric ethylene/α-olefin copolymer having a crystallinity of at least 5 percent and a α-olefin comonomer content in the range of from about 12 to about 40 weight percent based on the copolymer wherein the melt flow viscosity as determined by ASTM D–1238-65T(E) of the intermediate molecular weight polymer is at least about 5 times the melt flow viscosity of the high molecular weight ethylene copolymer and any α-olefin comonomer content of the intermediate molecular weight ethylene polymer is in the range of from about 0 to about ⁻ of the α-olefin comonomer content of the high molecular weight copolymer.

In another aspect, the invention is a process for the preparation of improved high density ethylene polymer blends which process comprises the steps of (1) polymerizing ethylene in a primary polymerization zone in the presence of a Ziegler catalyst at solution polymerization temperature under pressure sufficient to substantially insure that no vapor phase forms and that all reactants remain in solution; (2) subjecting, in an auxiliary polymerization zone to conditions of low pressure, solution polymerization in presence of Ziegler catalyst, monomers comprising ethylene and other α-olefins in proportions to provide a non-elastomeric copolymer having a crystallinity of at least about 5 percent and a major amount of polymerized ethylene and at least about 12 weight percent of polymerized other α-olefin; and (3) combining the resulting polymerization products of the polymerization zones in the liquid state in proportions to form a high density, ethylene polymer blend in which the polymerization product of the primary polymerization zone constitutes a major amount of the blend.

In the practice of this invention, it is found that the ethylene polymer blend is homogeneous and is easier to process than polymers having a narrow molecular weight distribution. Surprisingly, this resultant homogeneous blend exhibits good stress crack resistance and impact strength markedly superior to the high density ethylene homopolymer or copolymer of single stage polymerization and to blends of the high density ethylene hompolymer or copolymer with ethylene homopolymers and/or copolymers other than the high molecular weight ethylene/α-olefin copolymer as defined hereinbefore.

While the present invention is not to be limited to any particular theory, it is believed that the unexpectedly good stress crack resistance and impact strength observed for the blend of the present invention are caused by the solidification of the high molecular weight copolymer after the major amount of the intermediate molecular weight ethylene polymer solidifies. As a result of the phenomenon, it is believed that the longer molecules of the high molecular weight copolymer tend to form the perimeter of spherulites of the intermediate molecular weight ethylene polymer. These longer molecules tend to join adjacent spherulites and thereby become connecting links between spherulites. These connecting molecules contribute to the strength properties of the blend (e.g., impact strength) and tend to reduce stress forces as result of their low crystallinity.

In addition to improved stress crack resistance and impact strength, blends of the present invention have excellent processability such as reduced melt viscosity at high shear. Such blends are useful in the fabrication of cable jacketing, bottles, other containers such as bowls, tubs, cans, pails and drums, film sheet, filaments and a wide variety of other shaped articles.

DETAILED DESCRIPTION OF THE PREFERRED EMBODIMENTS

Preferred high density ethylene polymer blends of the present invention comprise at least about 60 weight percent of the intermediate molecular weight ethylene polymer and from about 5 to about 40 weight percent of the high molecular weight, non-elastomeric ethylen-/α-olefin copolymer. Preferably the blend has a total polymerized α-olefin comonomer content in the range of from about 0.6 to about 24 weight percent based on the blend, a melt flow viscosity (MFV) in the range of from about 0.1 to 30 decigrams/minute and a density of at least about 0.930. Especially preferred blends have a comonomer content in the range of from about 1 to about 15 weight percent based on the blend, a melt flow viscosity in the range of from about 0.2 to about 20 decigrams/minute and a density in the range of from about 0.940 to about 0.967 gm/cc. Most preferred are blends having a density in the range of 0.946 to 0.964, and MFV in the range of about 1.0 to 10.0 and an Izod impact in the range of 0.7 to 10.0 or more.

By the term "intermediate molecular weight ethylene polymer" is meant homopolymer of ethylene, an ethylene/α-olefin copolymer containing a predominant amount of polymerized ethylene and a minor amount (e.g., up to about 13 wt.%) of one or more polymerized α-olefin, and mixtures thereof. The intermediate molecular weight ethylene polymer preferably contains from about 0 to about 6 weight percent based on the polymer of polymerized α-olefins. Such intermediate molecular weight polymer preferably has a density in the range of from about 0.945 to about 0.970 gm/cc and melt flow viscosity (MFV) in the range of from about 0.5 to about 500 decigrams/minute, especially from about 0.955 to about 0.970 gm/cc and from about 1 to about 400 decigrams/minute, respectively.

By the term "high molecular weight, non-elastomeric ethylene/α-olefin copolymer" is meant a thermoplastic copolymer of ethylene and one or more α-olefins and mixtures of such copolymers which copolymers have a crystallinity of at least about 5 percent. The total α-olefin comonomer content of the copolymer is at least about 2 weight percent based on the copolymer. Preferably the total α-olefin comonomer content in the copolymer is from about 12 to about 40 weight percent based on the copolymer, especially from about 16 to about 25 weight percent, and the ethylene content is at least about 60 weight percent on the copolymer especially from about 75 to about 84 weight percent. Preferably, the copolymer has a melt flow viscosity (MFV) in the range of from about 0.0001 to about 6 decigrams/minute, especially from about 0.003 to about 1 decigram/minute, and a density in the range of from about 0.870 to about 0.955 gm/cc, especially from about 0.880 to about 0.945 gm/cc. The crystallinity of the high molecular weight copolymer is at least about 5 percent, preferably at least about 10 percent at normal room temperature, and especially from about 10 to about 70 percent. These copolymers have measurable tensile strength, elongation and the like.

In the foregoing polymer and copolymer, the term "α-olefin" means an aliphatic α-monoolefin having from 3 to 12 carbon atoms and includes such olefins as propylene, butene-1, pentene-1, hexene-1, heptene-1, octene-1, nonene-1, and dodecene-1, and mixtures of such α-olefins. Butene-1 is preferred and propylene is especially preferred.

In description of the relationship between the foregoing polymer and copolymer it is critical that the α-olefin comonomer content of the high molecular weight copolymer be at least three times of the intermediate molecular weight ethylene polymer, preferably at least 10 times. It is also critical that the melt flow viscosity (MFV) of the intermediate molecular weight polymer be at least about 5 times the MFV of the high molecular weight copolymer, preferably at least about 10 times. it is preferable that the "equivalent density" of the high molecular weight copolymer is at least about 0.01 gm/cc lower than the density of the intermediate molecular weight polymer.

By "equivalent density" is meant the density which the high molecular weight copolymer would have if it had the same melt flow viscosity as the intermediate molecular weight ethylene polymer. It is observed that as melt flow viscosity for polyethylene decreases by a factor of 10 that density decreases by 0.004 gm/cc. For example, polyethylene having a density of 0.966 gm/cc at melt flow viscosity of 10 decigrams/minute has an equivalent density of 0.950 gm/cc at melt flow viscosity of 0.001 decigram/minute.

For the purpose of this invention, crystallinity or degree of crystallinity of the high molecular weight copolymer is expressed as the weight percent of crystalline material based on the total copolymer. Crystallinity of the copolymer is determined using a differential scanning calorimeter wherein heat is applied to increase the temperature of a test tab of the copolymer at 10°C/minute and the heat flow rate is observed. The amount of heat required to melt the sample is calculated. Crystallinity of the copolymer is then determined using the heat of crystallinity of the copolymer sample and the heat of crystallinity of a polyethylene having a crystallinity of 100 percent.

Preparation of the aforementioned blends is carried out by the steps of (1) polymerizing ethylene or mixture of ethylene and α-olefin comonomer in a primary polymerization zone in a solvent in the presence of a Ziegler catalyst at solution polymerization temperature under conditions such that the intermediate molecular weight polymer is provided, (2) polymerizing a monomer mixture of ethylene and α-olefin in an auxiliary polymerization zone in the presence of Ziegler catalyst at solution polymerization temperature under conditions such that the high molecular weight copolymer is provided and (3) combining the polymerization products from the aforementioned polymerization zone while said products are still in the liquid state. It is understood that the foregoing process can be carried out in a batchwise or continuous manner, although a continuous manner is preferred. It is further to be noted that steps (1) and (2) can be carried out simultaneously in a parallel operation wherein polymerization is effected in two reactors operating as the primary and auxiliary polymerization zones or steps (1) and (2) can be carried out in series or sequence in forward or reverse order wherein the polymerization product of one zone is passed to a second zone by polymerizing monomer in one reactor under one set of conditions and withdrawing the polymerization mixture to a second reactor and polymerizing monomer in second zone under a separate set of conditions, during which time the polymer is maintained in solution.

In the production of the intermediate molecular weight ethylene polymer, the monomeric stream of ethylene or a mixture of ethylene and $\alpha$-olefin is supplied to the primary polymerization zone comprising a dispersion of Ziegler catalyst in an inert liquid diluent. Polymerization of the monomer is effected at solution polymerization temperature under relatively low pressure, e.g., nominally from about 20 to about 40 atmospheres depending on solvent and temperature, and preferably in the presence of a molecular weight control agent such as hydrogen. It is most desirable to employ hydrogen in concentrations of from about 0.1 to about 5 mole percent based on total monomer, especially from about 0.3 to about 2 mole percent. In the most preferred operation of the polymerization in the primary zone, hydrogen is supplied to the primary zone as part of the monomer stream. It is understood, however, that other means of controlling molecular weight such as catalyst concentration, ratio of components of Ziegler catalyst, monomer addition, monomer conversion temperature, other molecular weight control agents such as 2,3-dichloropropene-1, styrene, unsaturated hydrocarbons other than $\alpha$-olefins, such as acetylene, and the like, etc., or combination thereof may also be suitably employed. The monomeric portion of the monomer stream supplied to the primary polymerization zone comprises from about 70 to 100 mole percent ethylene and from 0 to about 30 mole percent $\alpha$-olefin comonomer, preferably from about 85 to 100 mole percent ethylene and from 0 to about 15 mole percent $\alpha$-olefin.

In the preparation of the high molecular weight ethylene/$\alpha$-olefin copolymer, the monomeric stream of ethylene and $\alpha$-olefin which stream preferably comprises from about 30 to about 85 mole percent ethylene and from about 70 to about 15 mole percent $\alpha$-olefin is supplied to the auxiliary polymerization zone comprising a dispersion of Ziegler catalyst in an inert liquid diluent. Polymerization is effected at solution polymerization temperature under relatively low pressure, e.g., normally from about 20 to about 40 atmospheres depending on solvent and temperature. In order to maximize the molecular weight of the polymer product of this zone, it is desirable to carry out the polymerization in the presence of little or no molecular weight control agent, e.g., up to about 1 mole percent based on monomer in the case of hydrogen, preferably in substantial absence of molecular weight control agent, and under such conditions of temperature and catalyst as to yield a copolymer product having MFV which is not more than about one-fifth of the MFV of the intermediate molecular weight product.

Reactors suitably employed for primary and/or auxiliary polymerization zones are preferably stirred vessels whiich will withstand the moderate pressures involved. Tubular reactors may be used, but require multiple feed points to assure copolymerization of the $\alpha$-olefin to form the high molecular weight copolymer.

For the purposes of this invention, suitable catalysts are the well-known Ziegler catalysts as described in U.S. Pat. No. 3,257,332 filed Nov. 15, 1954 and U.S. Pat. No. 3,051,690 filed July 29, 1955 which are hereby incorporated by reference. Such catalysts are well known as mixtures of a compound of a metal of groups 4b, 5b, 6b or 8 of the Periodic Table of Elements, 48th ed. of Handbook of Chemistry and Physics, Chemical Rubber Company, or manganese, in combination with organic metallic compound of an alkali metal, alkaline earth metal, zinc, earth metal, or rare earth metal. Preferably the Ziegler catalyst is the reaction product of a reducing organo-metallic component wherein the metal is aluminum and a reducible transition metal compound wherein the transition metal is titanium.

Exemplary preferred organo-metallic compounds include the aluminum trialkyls such as aluminum triethyl, aluminum tripropyl, aluminum triisobutyl, and other aluminum trialkyls wherein alkyl has from 1 to 12 carbon atoms; dialkyl aluminum halide such as diethyl aluminum chloride, diisobutyl aluminum chloride and others wherein alkyl has from 1 to 12 carbon atoms and halide is preferably chloride, but may be bromide, iodide or fluoride; alkyl aluminum hydride; alkyl aluminum alkoxide and the like.

The reducible transition metal component is preferably a halide, oxyhalide, alkoxide, cyclopentadivinyl, acetylacetonate, and the like of reducible titanium. By reducible titanium is meant titanium which exists in the tetravalent, and trivalent state. Especially preferred are titanium tetrachloride and titanium trichloride in the beta, alpha or gamma crystalline forms. Also especially desirable are the analogous compounds of vanadium and zirconium.

The especially preferred Ziegler catalyst for polymerizing the monomer or mixture of monomer in the production of the intermediate molecular weight ethylene polymer includes mixtures of titanium tetrachloride and aluminum triethyl or aluminum triisobutyl, mixtures of titanium trichloride, particularly the beta form, and aluminum triethyl or aluminum triisobutyl, mixtures of titanium tetrachloride and diethyl aluminum chloride, mixtures of titanium trichloride and diethyl aluminum chloride, mixtures of titanium trichloride and ethyl aluminum dichloride or isobutyl aluminum dichloride and the like.

The molar ratio of reducing organo-metallic component to reducible transition metal in the primary polymerization zone is from about 0.3:1 to about 40:1 with ratios in the range of about 0.5:1 to about 20:1 being preferred. The molar ratios of reducing organo-metallic component to reducible transition metal component in the auxiliary polymerization zone is from about 0.3:1 to about 40:1 with ratios in the range of from about 0.5:1 to about 20:1 being preferred.

The active catalyst to be used in either zone is preferably formed by premixing the appropriate reactants prior to entry of the catalyst into the respective polymerization zone. However, it may be suitably formed by injecting the reducing organo-metallic component and reducible transition metal component directly into the zone at the same or different positions in the zone. It is also suitable to employ a different catalyst mixture in each polymerization zone.

When the polymerization of monomer or mixture of monomers in either polymerization zone is carried out in series or sequential operation, immediately following polymerization in the other zone, it should be noted that due to the short life of the catalyst during solution polymerization, as compared to slurry polymerization, that little if any live catalyst from the first polymerization zone is carried over to the second polymerization zone even though the entire reaction mixture of the first zone is transferred. Accordingly, although in the sequential operation it is possible to add large excess of fresh catalyst in first zone for carry over into second zone, it is preferred to add fresh catalyst to each zone. In operation of the zone in parallel fashion, it is essential to add "fresh catalyst" to each polymerization zone. By fresh catalyst is meant catalyst in which the particles thereof do not have attached to them a polymer chain or chains produced in the first polymerization step of the sequential operation.

Catalysts concentration provides a primary means for controlling conversion of monomer to polymer, and, to some extent, for controlling molecular weight of the resultant polymer of either zone. The catalyst is present in catalytic amounts in both of the zones. As a general rule, catalyst concentration may vary from about $3 \times 10^{-5}$ to about $1.5 \times 10^{-3}$ millimoles/liter for the transition metal component although it is preferable to keep the catalyst concentration in the range of from about $8 \times 10^{-5}$ to about $1 \times 10^{-3}$ millimoles/liter.

The inert liquid diluent suitably employed as vehicle for catalyst and diluent for reaction mixture is liquid under the conditions of the reaction and is essentially inert. Suitable diluents are saturated acyclic aliphatic or cycloaliphatic hydrocarbons such as alkanes and cycloalkanes such as butane, isobutane, pentane, hexane, isooctane, cyclohexane, methylcyclohexane, tetralin, and decalin. Preferably, diluents are saturated hydrocarbon mixtures boiling in the range of from about 60° to about 200°C. Also suitable are the aromatic hydrocarbons such as benzene, toluene, isopropylbenzene, xylene, or the like.

Although it is possible to use technical grades of ethylene and other olefin monomers and diluents, containing the normal impurities present in such grades, it is much preferred to use pruified monomer feed and purified diluents which are relatively free of impurities. Processes for purifying ethylene and other olefin monomers and diluents for low pressure polymerization using Ziegler catalysts are now well known to the art and are equally suitable for preparing feeds and diluents for use in practice of this invention.

In the practice of the present invention, it is desirable that polymerization in both primary and auxiliary zones be carried out under conditions which maintain solubilization of the polymer in the inert liquid diluent. In addition, it is desirable to avoid excessive pressure drops in each polymerization zone and throughout the system, such as those experienced when transporting highly viscous solutions and to avoid recovery problems encountered in the handling of excessively large volumes of diluent. Based on the above considerations, it is preferable to adjust the diluent volume such that concentration of polymer in solution leaving each of the primary and auxiliary zones is less than about 20 weight percent, especially between about 5 to about 15 percent. In practice, the diluent is normally added with either or both of the catalyst and monomer feed streams, although if desirable, further additions of diluent may be made to either reactor.

For the purpose of polymerization in the primary zone and the auxiliary zone, the term "solution polymerization temperature" is meant to include temperatures at least above the precipitation point of the polymer formed. Generally, the temperature is in the range of from about 120° to about 220°C, preferably from about 135° to about 180°C, with a temperature of about 150°C being especially preferred.

The reaction pressure of the primary and auxiliary polymerization zones is not particularly critical and is advantageously between about 20 and about 40 atmospheres, preferably about 35 atmospheres. It is understood, however, that depending on the solvent and temperature of polymerization that pressures as low as about 10 atmospheres and as high as about 50 atmospheres or more can also be suitably employed.

In other respects, the polymerization in the primary and auxiliary polymerization zones are carried out in a manner typical of low pressure, Ziegler polymerization of α-monoolefins.

The polymerization time is not particularly critical and polymerization conditions can be controlled so that the polymerization time in either the primary or auxiliary zone can vary from a few minutes to several hours.

In a preferred continuous parallel operation, fresh monomer feed, diluent and catalyst are continuously introduced into an agitated primary polymerization zone and an agitated auxiliary polymerization zone and the reaction mixtures of both zones are continuously withdrawn from their respective zone and immediately combined in desired proportions while the reaction mixtures are in liquid state. By "liquid state" is meant that the polymer is either in solution or is maintained at temperature sufficiently high to prevent solidification.

Alternatively, in preferred operation of the process in a continuous sequential manner, the fresh monomer feed, diluent and catalyst are first continuously introduced into either of the agitated primary or agitated auxiliary polymerization zones followed by continuous withdrawal of reaction product of this first polymerization zone to the second polymerization at which time fresh monomer feed, diluent and catalyst are continuously introduced into the second polymerization zone.

The rate of agitation used in either zone in parallel or series operation is not particularly critical as it is suitable to employ rates of agitation commonly practiced in low pressure Ziegler polymerization, preferably rates which are sufficient to provide uniform dispersal of ingredients throughout the reaction mixture.

The resultant polymer blend of the present invention is recovered from liquid diluent by conventional means such as by removing the solvent following deactivation of catalyst. The polymer blend may first be isolated from the combination of reaction mixtures and then treated in conventional manner to remove catalyst residues. Preferably, however, the combination of reaction mixtures containing the polymer blend is treated directly in order to remove the residues. Such treatment may be with alcohols such as methanol, ethanol or isopropanol, with acidified alcohols, or with other similar polar liquids, or with several materials in sequence, such as alcohols followed by hydrogen chloride.

The following examples are given to illustrate this invention and should not be construed as limiting its scope. In this specification and the following examples, the term "melt flow viscosity" (MFV) denotes polymer flow properties in decigrams/minute as determined by ASTM D–1238-65T(E) and the term "density" denotes absolute polymer density in grams/cubic centimeter as determined by ASTM D–1505–63T. In the following examples all parts and percentages are by weight unless otherwise indicated.

The following examples are carried out using hereinafter specified catalyst dispersion, reactors and general procedure. The catalyst dispersion is prepared by mixing in the following order:

- 88 pounds of dry isooctane
- 18 pounds of titanium tetrachloride
- 58 pounds of 15 percent aluminum triethyl in isooctane under nitrogen atmosphere at maximum temperature in range of 38°–50°C. The molar ratio of aluminum triethyl to titanium tetrachloride is approximately 0.8:1. The primary zone reactor, a 250 gallon spherical, agitated, steam traced, insulated vessel, and auxiliary zone reactor, a 22-gallon spherical, agitated, steam traced, insulated vessel, are operated simultaneously in continuous parallel fashion or sequentially in series as indicated. In practice, the reactors are purged with nitrogen, filled with isooctane, and brought to specified temperature. Then as the feed streams are introduced, an equivalent volume of reaction mixture is removed from the particular reactor.

EXAMPLE 1

In this example the auxiliary and primary reactors are operated simultaneously in parallel fashion. To the auxiliary reactor initially filled with isooctane and maintained at about 450 psig at 150°C is continuously charged a monomer feed stream consisting of 21 lbs/hr ethylene, 22 lbs/hr propylene and 411 lbs/hr isooctane along with a stream of the catalyst dispersion at an average rate of about 0.03 lbs/hr. The reaction is controlled at approximately 150°C and pressure of ~450 psig; the operation is not adiabatic inasmuch as heat losses to the atmosphere are significant. Ethylene/propylene copolymer is produced at a rate of about 14 lbs/hr with retention time of about 17 minutes. Effluent from the auxilary reactor containing ethylene/propylene copolymer is continuously withdrawn from the auxiliary reactor to a zone for mixing with primary reactor product. A portion of the ethylene/propylene copolymer is withdrawn for testing and is found to have a MFV of 0.086 decigrams/minute, about 16 weight percent of polymerized propylene, an average of 52 methyls/1,000 carbon atoms in polymer chain and density of 0.904 gm/cc.

Simultaneously, to the primary reactor, initally filled with isooctane and maintained at about 450 psig at 150°C, is continuously charged a monomer feed stream consisting of 61 lbs/hr ethylene, 0.061 lb/hr hydrogen and 430 lb/hr isooctane along with a stream of the catalyst dispersion at an average rate of about 0.71 lb/hr. The reaction is controlled at approximately 150°C and pressure of ~450 psig. The operation in the primary reactor is more nearly adiabatic than in the auxiliary reactor, but heat losses from the primary reactor to atmosphere are also significant. Polyethylene is produced at a rate of about 51 lb/hr with retention time of about 180 minutes. A portion of the polyethylene is withdrawn for testing and is found to have a MFV of 9 decigrams/minute and density of 0.967 gm/cc. Effluent from the primary reactor containing polyethylene is continuously withdrawn from the primary reactor to the mixing zone and mixed with the copolymer from the auxiliary reactor while both polymers are in solution in isooctane at temperature of 150°C which is above the precipitation point of each polymer. Mixing is effected by turbulent flow as both polymer solutions are passed through a line or conduit. The reaction mixtures are combined such as to provide about 22 weight parts of the ethylene/propylene copolymer per 78 weight parts of polyethylene, on a dry basis.

The resultant mixed solution of ethylene polymer blend and catalyst residues in isooctane is treated in a conventional manner by mixing the solution with isopropanol to deactivate the catalyst and to remove catalyst residues and to recover the polymer blend in molten form from isooctane. After purification and isolation, the polymer blend is shown to have a density of 0.956, MFV of 3.0 decigrams/minute and ~3.6 weight percent of polymerized propylene based on the blend. The blend (Sample No. 1) is tested for stress crack resistance, impact strength and processability, and the results are recorded in Table I.

For the purposes of comparison and to show the advantages of the present invention, a standard ethylene polymer (Sample No. $C_1$) having about the same density and processability as the foregoing blend is produced in a single reactor under conditions similar to those employed in the primary reactor except that propylene is included in the monomer feed. The resulting polymer is tested for density, MFV, stress crack resistance, impact strength and processability and the results are recorded in Table I.

TABLE I

| Sample No. | Polymer Composition | MFV(1), dg/min | Density, gm/cc | Processability,(2) poise at 190°C and 1000 sec$^{-1}$ | Izod Impact(3) | SCR,(4), Hours |
| --- | --- | --- | --- | --- | --- | --- |
| 1 | 78% PE(a) 22% Et/pr(b) | 3.0 | 0.956 | 2250 | 3.4 | 288 |
| $C_1$* | Et/Pr(c) | 6.2 | 0.955 | 2380 | 0.66 | 25 |

*Not an example of this invention.
(a)Polyethylene having melt flow viscosity of 9 dg/min and density of 0.967 gm/cc.
(b)Ethylene/propylene copolymer (84/16) having melt flow viscosity of 0.086 dg/min density of 0.904 gm/cc, and degree of crystallinity of 23 percent as determined using a differential scanning calorimeter.
(c)Ethylene/propylene copolymer (97/3).
(1)Melt Flow Viscosity in decigrams/minute determined in accordance with ASTM D-1238–65T except that the 2.16 Kg weight is used in all cases (even a melt flow viscosity values above 10.0).
(2)Viscosity in poises at 190°C and 1000 sec$^{-1}$ determined in accordance with ASTM D-1703–62. A lower value indicates a better processability.

(3)Impact resistance in foot-pounds/inch of notch as determined by ASTM D-256–56.
(4)Stress crack resistance determined in accordance wtih ASTM D-1693 using molded tab having thickness of 30 mil in ½% Igepal. Results are reported as number hours before 5 of 10 samples failed by cracking.

EXAMPLE 2

Generally in accordance with the parallel operation of Example 1, an additional blend (Sample No. 2) is prepared. The polymer blend (Sample No. 2) is recovered and tested for MFV and impact resistance and the results are recorded in Table II.

For purposes of comparison and to establish the criticality of concentrating α-olefin comonomer in the high molecular weight fraction, three comparative blends (Sample Nos. A₁-A₃) are prepared. Such blends are generally similar to the blend of Sample No. 2 except that low concentrations (i.e., less than 12 weight percent) of propylene are polymerized in the high molecular weight fraction (high molecular weight copolymer). The resultant comparative blends are recovered and tested for MFV and impact resistance and the results are recorded in Table II.

centrated in the high molecular weight fraction. The blends are recovered and tested for processability, impact strength, and density. The test results are recorded in Table III.

For the purposes of comparison, several comparative blends (Sample Nos. B₁-B₃) are prepared in the same general manner but wherein propylene is not concentrated in the high molecular weight fraction. These comparative blends are also recovered and tested for processability, impact strength and density. The test results for the comparative blends are also recorded in Table III.

TABLE III

| Sample No. | Polymer Composition | % Pr HMW(7) | % Pr IMWF(8) | Ratio Pr(5) | Blend MFV(1), dg/min | Blend Density | Processability(2), poise at 190°C and 1000 sec⁻¹ | Izod Impact(3), ft-lb/inch of notch |
|---|---|---|---|---|---|---|---|---|
| 1 | 78% PE(a) 22% Et/Pr(b) | 16 | 0 | ∞ | 2.09 | 0.956 | 2790 | 5.06 |
| B₁* | 83% Et/Pr(c) 17% Et/Pr(d) | 1.8 | 1.5 | 1.2 | 2.12 | 0.952 | 2450 | 0.85 |
| 2 | 78% PE(e) 22% Et/Pr(b) | 16 | 0 | ∞ | 2.97 | 0.9565 | 2250 | 3.41 |
| B₂* | 83% Et/Pr(f) 17% Et/Pr(d) | 1.8 | 1.5 | 1.2 | 3.51 | 0.956 | 2080 | 0.51 |
| 3 | 78% PE(g) 22% Et/Pr(b) | 16 | 0 | ∞ | 5.19 | 0.959 | 1620 | 1.16 |
| B₃* | 83% Et/Pr(h) 17% Et/Pr(d) | 1.8 | 1.5 | 1.2 | 11.62 | 0.958 | 1080 | 0.38 |

* Not an example of the invention.
(a) Polyethylene having melt flow viscosity of 8 dg/min and density of 0.967 gm/cc.
(b) Ethylene/propylene copolymer (84/16) having melt flow viscosity of 0.086 dg/min and density of 0.904 gm/cc.
(c) Ethylene/propylene copolymer (98.5/1.5) having melt flow viscosity of 8 dg/min and density of 0.956 gm/cc
(d) Ethylene/propylene copolymer (98.2/1.8) having melt flow viscosity of 0.004 dg/min and density of 0.943 gm/cc.
(e) Polyethylene having melt flow viscosity of 9 dg/min and density of 0.967 gm/cc.
(f) Ethylene/propylene copolymer (98.5/1.5) having melt flow viscosity of 13 dg/min and density of 0.958 gm/cc.
(g) Polyethylene having melt flow viscosity of 13 dg/min and density of 0.968 gm/cc.
(h) Ethylene/propylene copolymer (98.5/1.5) having melt flow viscosity of 49 dg/min and density of 0.959 gm/cc.
(1)-(3) and (5) Same as in Table I.
(7) Weight percent of polymerized propylene in high molecular weight polymer fraction.
(8) Weight percent of polymerized propylene in intermediate molecular weight polymer fraction.

TABLE II

| Sample No. | Polymer Composition | Ratio Pr(5) | Blend MFV(1), dg/min | Ratio MFV(6) | Propylene Concentration in High Molecular Weight Copolymer, Wt.% | Izod Impact(3), ft-lb/inch of notch |
|---|---|---|---|---|---|---|
| 2 | 76% PE(f) 24% Et/Pr(g) | ∞ | 3.2 | 15 | 16 | 3.3 |
| A₁* | 74% PE(h) 26% Et/Pr(i) | ∞ | 3.12 | 1727 | 6.6 | 0.87 |
| A₂* | 83% Et/Pr(j) 17% Et/Pr(k) | 1.2 | 3.5 | 3250 | 1.8 | 0.51 |
| A₃* | 84% Et/Pr(l) 16%Et/Pr(m) | 3 | 2.5 | 3000 | 3.3 | 0.76 |

*Not an example of this invention.
(f)Polyethylene having MFV of 5 dg/min and density of 0.967 gm/cc.
(g)Ethylene/propylene copolymer (75.1/24.9) having MFV of 0.33 dg/min, density of 0.896 gm/cc, and degree of crystallinity of ~19 percent using differential scanning calorimeter.
(h)Polyethylene having MFV of 19 dg/min and density of 0.968 gm/cc.
(i)Ethylene/propylene copolymer (93.4/6.6) having MFV of 0.011 dg/min, density of 0.926 gm/cc and degree of crystallinity of ~44 percent using differential scanning calorimeter.
(j)Ethylene/propylene copolymer (98.5/1.5) having MFV of 13 dg/min and density of 0.958 gm/cc.
(k)Ethylene/propylene copolymer (98.2/1.8) having MFV of 0.004 dg/min, density of 0.943 gm/cc, and degree of crystallinity of ~60 percent using differential scanning calorimeter.
(l)Ethylene/propylene copolymer (98.9/1.1) having MFV of 9 dg/min and density of 0.956 gm/cm.
(m)Ethylene/propylene copolymer (96.7/3.3) having MFV of 0.003 dg/min, density of 0.936 gm/cc and degree of cyrstallinity of ~53 percent using differential scanning calorimeter.
(1)Same as (1) in Table I.
(3)Same as (3) in Table I.
(5)Weight ratio of propylene in high molecular weight fraction to propylene in intermediate molecular weight fraction.
(6)Ratio of melt flow viscosity of intermediate molecular weight fraction to melt flow viscosity of high molecular weight fraction.

EXAMPLE 3

In accordance with Example 1, several blends (Sample Nos. 1-3) are prepared wherein propylene is con-

What is claimed is:

1. A normally solid, homogeneous, high impact, high density ethylene polymer blend comprising a major amount of intermediate molecular weight, high density ethylene polymer consisting essentially of ethylene and optionally other α-olefin comonomer units and a minor amount of at least about 3 weight percent based on the blend of high molecular weight, non-elastomeric ethylene/α-olefin copolymer having a crystallinity of at least 5 percent and an α-olefin comonomer content from about 12 to about 40 weight percent based on the copolymer, said high molecular weight copolymer having (1) melt flow viscosity value not greater than about one-fifth the melt flow viscosity value of said intermediate molecular weight polymer and (2) an α-olefin comonomer content at least about 3 times on a weight basis of any α-olefin comonomer content of said intermediate molecular weight polymer, both of said ethylene polymers having been prepared under solution polymerization conditions and blended in the liquid state.

2. The blend according to claim 1 comprising (A) at least about 60 weight percent of intermediate molecular weight ethylene polymer containing from about 0 to about 6 weight percent based on the polymer of polymerized aliphatic α-monoolefin with from 3 to 12 carbon atoms and having density of from about 0.945 to about 0.970 gm/cc and melt flow viscosity of from about 0.5 to about 500 decigrams per minute and (b) from about 5 to about 40 weight percent of a high molecular weight, non-elastomeric ethylene/α-olefin copolymer having a crystallinity of at least about 10 percent and containing from about 16 to about 40 weight percent based on the copolymer of polymerized aliphatic α-monoolefin with from 3 to 12 carbon atoms and having density of from about 0.870 to about 0.955 gm/cc and melt flow viscosity of from about 0.0001 to about 6 decigrams/minute, said high molecular weight copolymer having (1) a melt flow viscosity value not greater than about one-tenth the melt flow viscosity value of said intermediate molecular weight polymer and (2) an α-olefin comonomer content at least about 10 times on a weight basis the α-olefin comonomer content of said intermediate molecular weight polymer, said blend having an α-olefin comonomer content of from about 1 to about 15 weight percent based on the blend, a melt flow viscosity of from about 0.2 to about 20 decigrams/minute and density of from about 0.940 to about 0.967 gm/cc.

3. The blend according to claim 2 wherein the intermediate molecular weight ethylene polymer is polyethylene.

4. The blend according to claim 3 wherein the high molecular weight ethylene/α-olefin copolymer is an ethylene/propylene copolymer containing from about 16 to about 25 weight percent based on the copolymer of polymerized propylene.

5. The blend according to claim 4 wherein the blend has an Izod impact strength of from about 1.0 to about 10.0 foot-pounds/inch of notch, a density of from about 0.946 to about 0.964 gm/cc, and a melt flow viscosity in the range of from about 1.0 to about 10.0 decigrams/minute.

6. The blend of claim 1 wherein the copolymer contains 16 weight percent of polymerized propylene.

7. The blend of claim 2 wherein the copolymer contains 24.9 weight percent of polymerized propylene.

8. A process for the preparation of a normally solid, homogeneous, high impact, high density ethylene polymer blend which process comprises the steps of (1) polymerizing ethylene in a solvent in a primary polymerization zone in the presence of a Ziegler catalyst at solution polymerization temperature under pressure sufficient to insure that substantially no vapor phase is formed; (2) copolymerizing ethylene and an α-olefin in a solvent in an auxiliary polymerization zone in the presence of a Ziegler catalyst at solution polymerization temperature under pressure sufficient to substantially insure that no vapor phase is formed, said polymerization of steps (1) and (2) being carried out in cooperation such that (A) the resultant polymer product of said auxiliary zone has a melt flow viscosity value not greater than one-fifth the melt flow viscosity value of the resultant polymer product of said primary polymerization zone and (B) said product of said auxiliary zone having an α-olefin comonomer content of at least 3 times on a weight basis the α-olefin comonomer content of said product of said primary polymerization zone; and (3) combining the resultant polymerization products of said polymerization zones in liquid state in proportion such that the polymer product of said primary zone constitutes a major amount of the resultant blend.

* * * * *

UNITED STATES PATENT AND TRADEMARK OFFICE
CERTIFICATE OF CORRECTION

PATENT NO. : 3,914,342

DATED : October 21, 1975

INVENTOR(S) : John H. Mitchell

It is certified that error appears in the above-identified patent and that said Letters Patent are hereby corrected as shown below:

Column 2, line 14, delete "a", second instance, and insert --an--.

Column 2, line 23, delete "-" and insert --1/3--.

Column 3, line 21, delete "ethylen-" and insert --ethylene- --.

Column 3, line 62, insert after "percent" --based--.

Column 5, line 65, delete "whiich" and insert --which--.

Column 7, line 13, insert quote marks around the words "fresh catalyst".

Column 7, line 42, delete "pruified" and insert --purified--.

Column 7, line 62, insert --weight-- after 15.

Column 9, line 12, insert --a-- after the word "under".

In Table I, footnote 1, second line, delete "a" and insert --at--.

In Table II, footnote 1, first line, delete "gm/cm" and insert --gm/cc--.

In Table II, footnote m, first line, delete "cyrstallinity" and insert --crystallinity--.

UNITED STATES PATENT AND TRADEMARK OFFICE
CERTIFICATE OF CORRECTION

PATENT NO. : 3,914,342
DATED : October 21, 1975
INVENTOR(S) : John H. Mitchell

It is certified that error appears in the above–identified patent and that said Letters Patent are hereby corrected as shown below:

Column 13, line 7, insert --a-- after (1).

Signed and Sealed this tenth Day of February 1976

[SEAL]

Attest:

RUTH C. MASON
*Attesting Officer*

C. MARSHALL DANN
*Commissioner of Patents and Trademarks*